April 15, 1969     H. A. RAAB     3,438,319
BALING SYSTEM
Filed Sept. 21, 1965
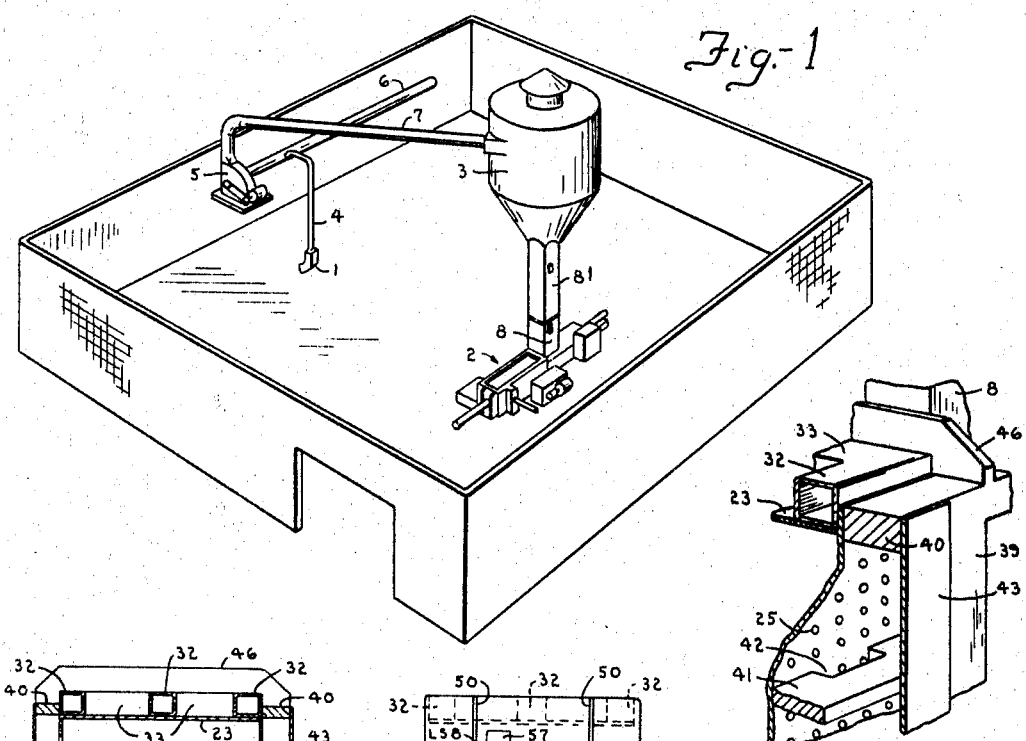
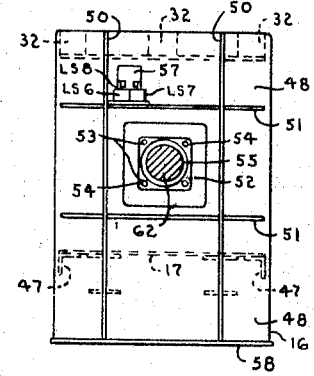
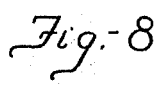
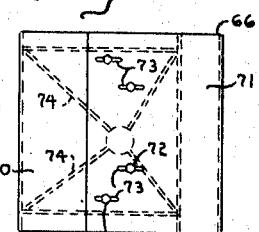
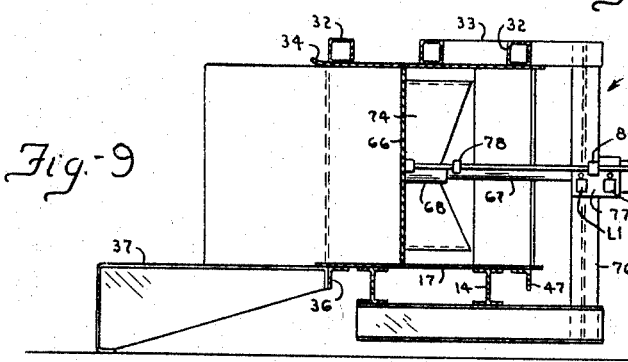
INVENTOR.
HILARY A. RAAB
BY *Charles J. Penfold*
ATTORNEY

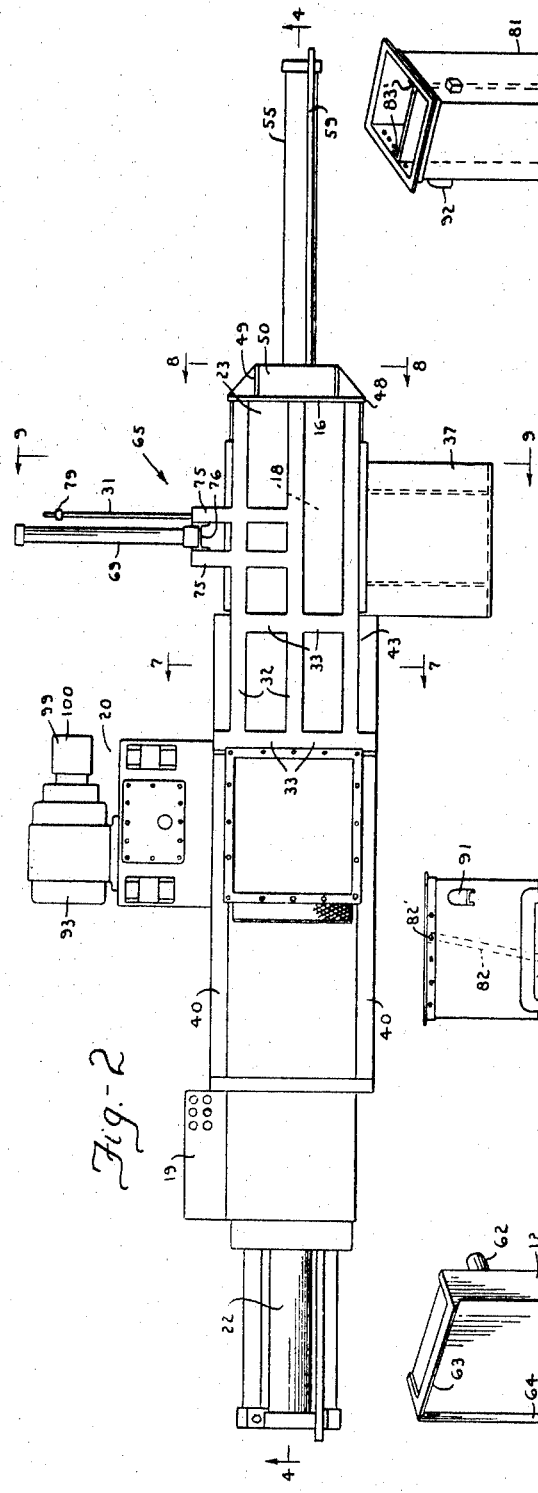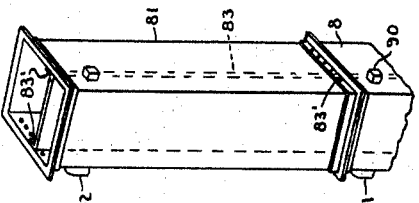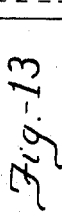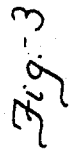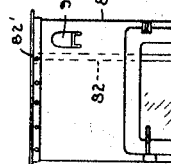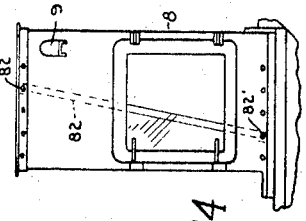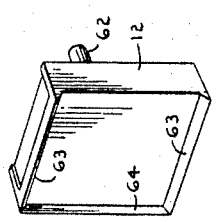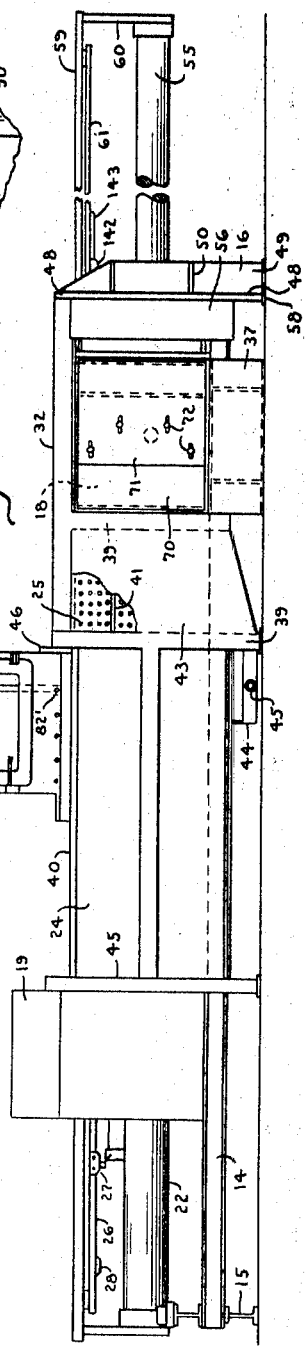
INVENTOR.
HILARY A. RAAB
BY
ATTORNEY

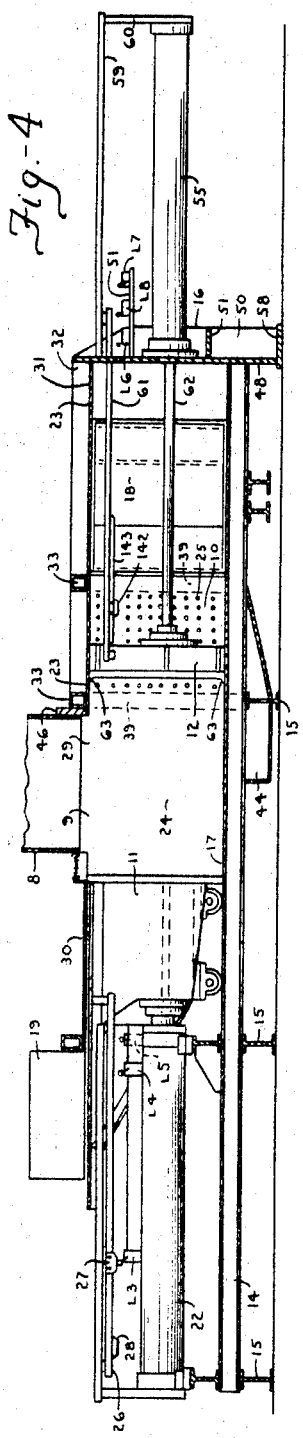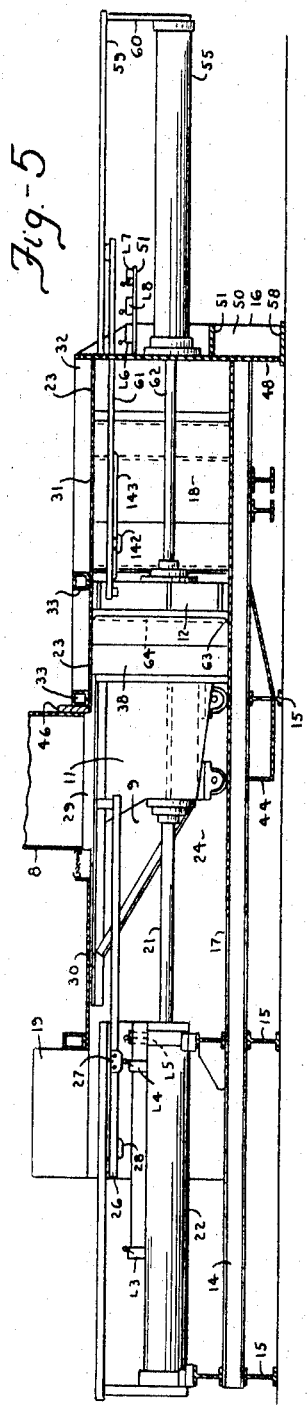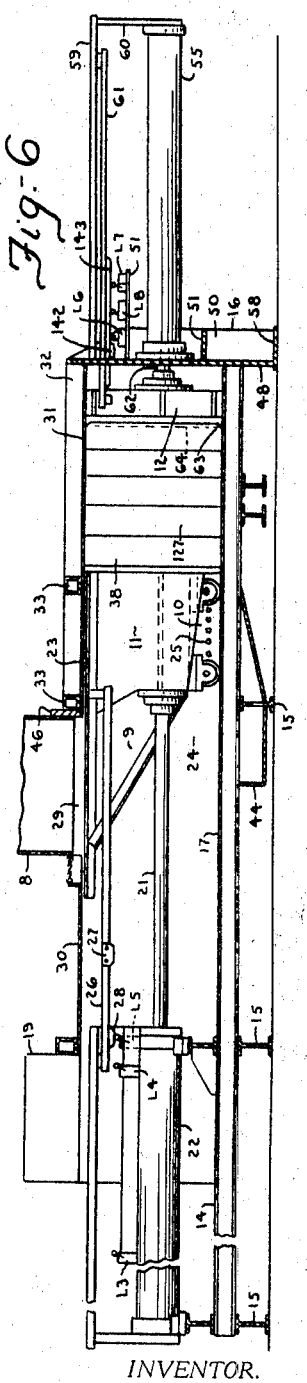

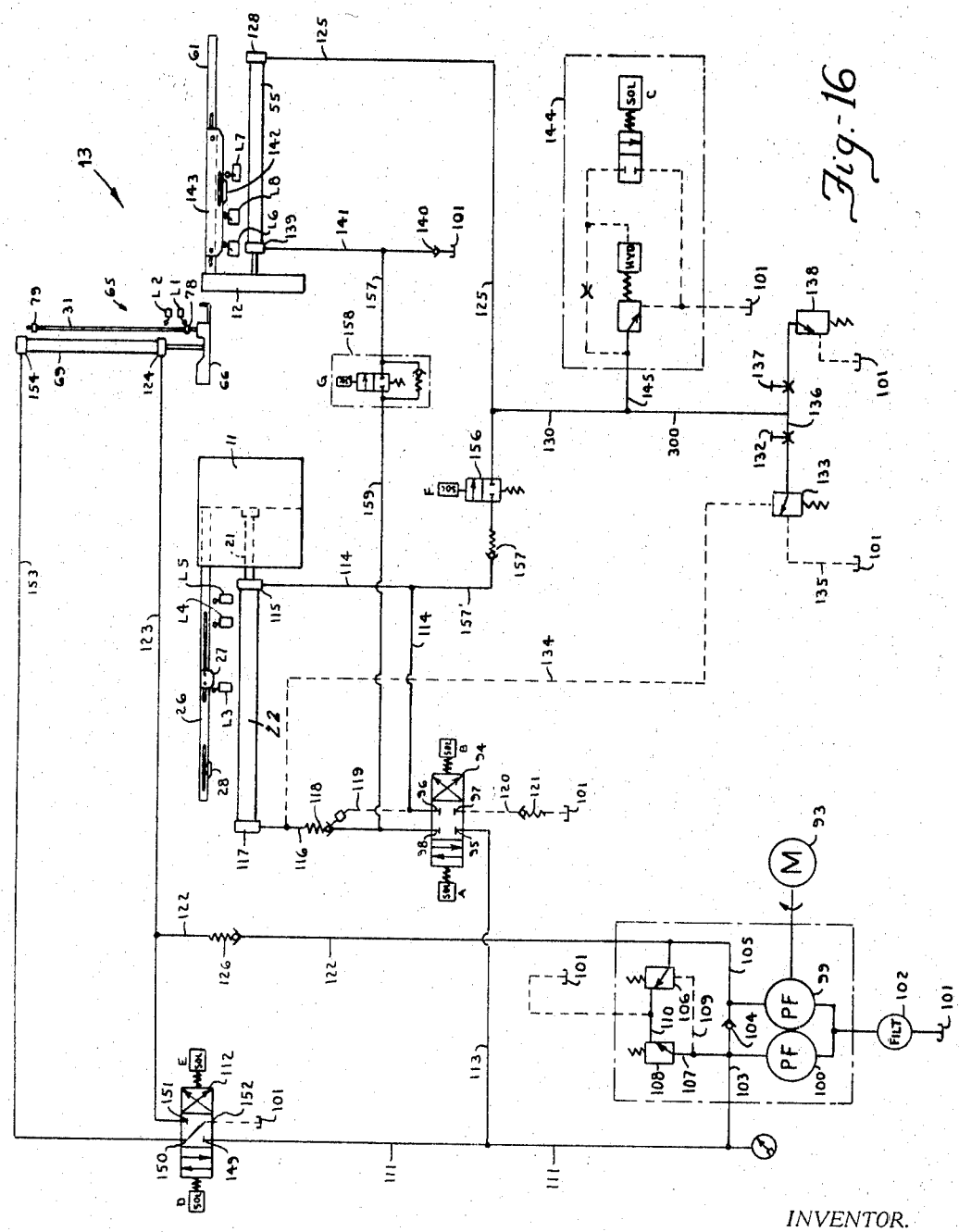

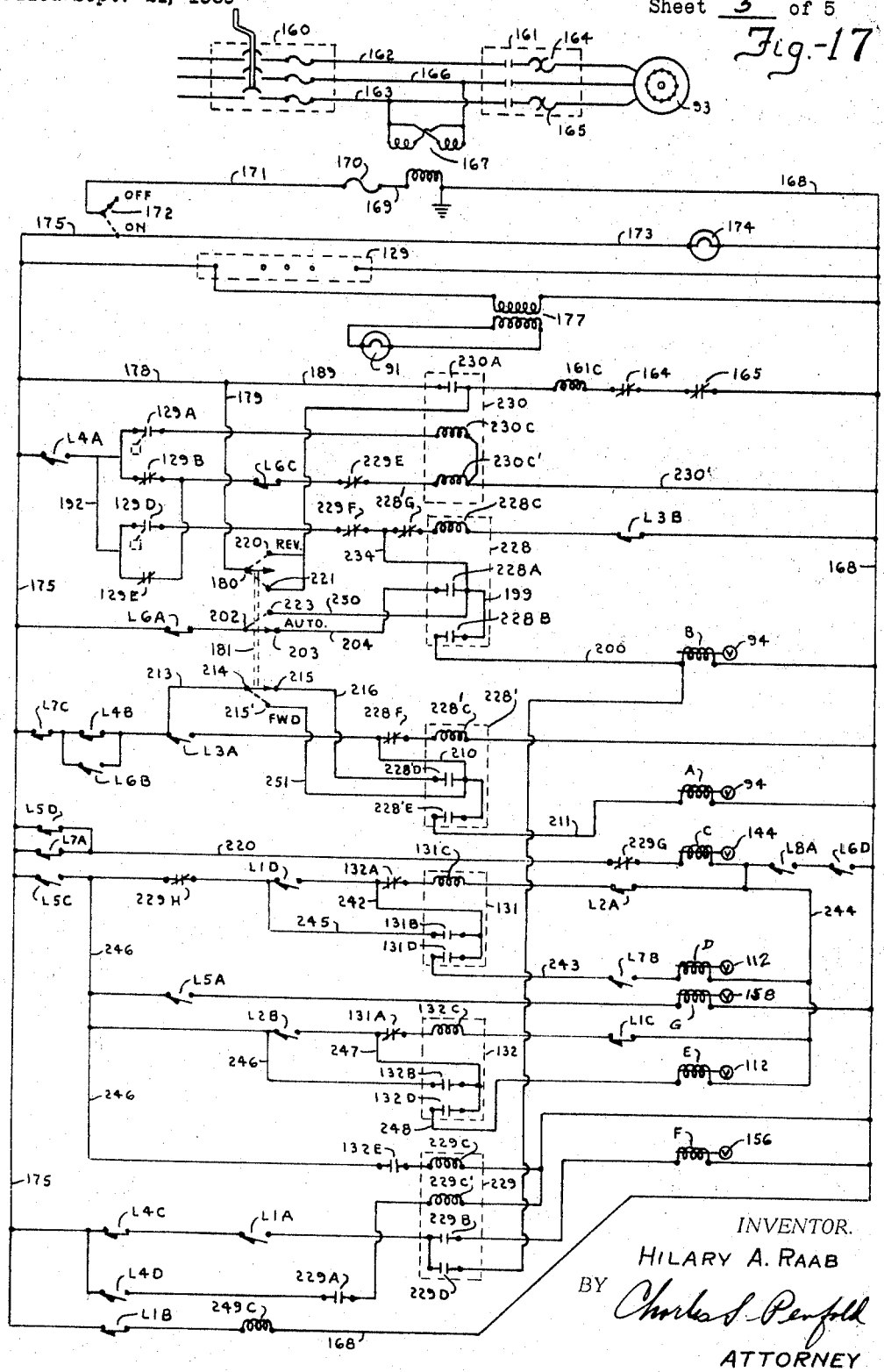

United States Patent Office 3,438,319
Patented Apr. 15, 1969

3,438,319
BALING SYSTEM
Hilary A. Raab, Hammond, Ind., assignor to East Chicago Machine Tool Corporation, East Chicago, Ind., a corporation of Indiana
Filed Sept. 21, 1965, Ser. No. 489,029
Int. Cl. B30b 13/00, 15/26, 5/00
U.S. Cl. 100—35      30 Claims

ABSTRACT OF THE DISCLOSURE

The invention, among other things, is directed to a baling machine and method whereby a pair of reciprocal rams coact to compact material into a mass within the confines of an elongate chamber having an outlet intermediate its length, and means for ejecting the mass laterally through the outlet.

---

The subject invention relates generally to a machine, system and method whereby material may be automatically compacted into shapes or bales of substantially uniform size and maximum density.

The machine embodying the invention has been primarily designed and constructed to compact material, such as pulp and scrap papers but may be utilized to compact any other suitable material or product.

A significant object of the invention is to provide a machine comprising, among other things, an elongate chamber for receiving material to be compacted, primary and secondary means or rams which are operable in conjunction with one another for compacting the material into a mass or body, and a third means or ram which serves to automatically eject the mass laterally from the chamber after it has obtained a predetermined condition or size.

Another object of the invention is to provide a machine or baler with power means which is preferably in the form of novel fluid or hydraulic structure for operating or applying forces or pressures to the various rams.

An important object of the invention is to provide a machine in which the power means thereof serves to control the operation of the secondary ram and the latter constitutes an abutment or platen which offers resistance to forward movement of the mass whereby to assist in obtaining, within practicable limits, a well-shaped body or mass of a desired or predetermined density.

A particularly important object of the invention is to provide a machine having a unique system of controls which may be readily adjusted in a manner whereby the material may be automatically compacted into wafers, laminations or layers of desired predetermined thicknesses or sizes.

An additional object is to provide a machine with means for determining a condition, size or length of the compacted material or mass and operatively connect this determining means with the power means and the fluid operable means in a manner whereby the latter controls the power applied to the primary ram, including means for controlling the operation of the fluid operable means for effecting positioning of the mass or bale in a predetermined position for ejection and release by the secondary ram after the mass has attained the desired condition or position.

Another object of the invention is to provide a machine with means for determining a position of the compacted material or mass, means for determining the release or position of the secondary ram, and operatively connecting the latter with the power means and fluid operable means whereby the former automatically controls the power applied to the third ram for ejecting the mass from the machine.

A particular object of the invention is to provide a machine in which certain of the walls or wall structure of the elongate chamber are perforated so that when the material is being compacted liquid and/or air may be squeezed therefrom through such walls for collecting and evacuating from the machine.

A further object of the invention is to provide a machine with electrical means which are operatively connected or interlocked in a manner whereby to promote continuity in the operations of compressing material into a mass, ejecting the mass from the machine automatically after it has been formed into a substantially uniform size.

Another object of the invention is to provide a plurality of manual controls in the electrical system whereby the automatic operations may be readily reestablished in the event that electrical power to the machine is interrupted.

A specific object of the invention is to provide a secondary ram or platen which embodies improved principles of design and construction, particularly as to its rear structural characteristics which are formed to compact the corners of the mass in a manner whereby to substantially prevent breakage of the mass at the corners thereof.

Other objects of the invention reside in providing a machine, system or method which offers advantages with respect to manufacture, assembly, installation, operation, efficiency, durability, safety and low cost of maintenance.

Many other objects and advantages of the invention will become apparent after the description hereinafter set forth is considered in conjunction with the drawings annexed hereto.

In the drawings:

FIGURE 1 is a schematic perspective view generally illustrating certain of the components of the system;

FIGURE 2 is a top view of the machine showing the relative position of certain of its components;

FIGURE 3 is a side elevational view of the structure illustrated in FIGURE 2, with at least a portion thereof in section for the purpose of illustrating certain details thereof;

FIGURE 4 is a vertical section taken substantially on line 4—4 of FIGURE 2;

FIGURES 5 and 6 are vertical sections similar to FIGURE 4 showing certain of the operating components illustrated in FIGURE 4 in different operating positions;

FIGURE 7 is an enlarged transverse section taken substantially on line 7—7 of FIGURE 2;

FIGURE 8 is an enlarged transverse section taken substantially on line 8—8 of FIGURE 2;

FIGURE 9 is an enlarged transverse section taken substantially on line 9—9 of FIGURE 2;

FIGURE 10 is a partial perspective view showing a perforated wall of a baling chamber;

FIGURE 11 is a top view of an ejector ram shown in FIGURE 12;

FIGURE 12 is a front elevational view of the ejector ram;

FIGURE 13 is a partial perspective view of a delivery chute provided with control means for adjusting the size of the charge of material fed to the baling chamber;

FIGURE 14 is a view of a lower section of the feed chute structure showing a divider therein adjusted to a position different from that illustrated in FIGURE 3;

FIGURE 15 is a perspective view showing the structural characteristics of a frontal impact receiving area of a secondary ram;

FIGURE 16 is a diagram of the hydraulic circuitry; and

FIGURE 17 is a diagram of the electrical circuitry.

The system embodying the invention may be designed and constructed in various ways, but as exemplified in FIGURE 1 of the drawings, it includes, among other things, a receiver 1 for initially receiving material or a product to be compacted or baled in a machine or baler generally designated 2, a collector or cyclone separator 3, a conduit 4 communicatively connecting the receiver to an exhauster 5 by a duct 6, a conduit 7 connecting the exhauster and separator, and a discharge or feed chute 8 and 81 connecting the collector with the baler. The system may include additional material receivers corresponding to the receiver 1 which may be connected to the duct 6.

The machine, among other things, comprises an elongate chamber or structure which is divided to form a first or material receiving chamber 9 and a second or forming chamber 10, a primary ram 11 and a secondary or resistance ram 12, and power means generally designated 13 as depicted in FIGURE 16 for operating the primary ram to compact material received in the chamber against the secondary ram or platen and fluid operable means operatively connected to the power means and the secondary ram whereby to offer resistance to the travel of the latter with the material being compacted and for controlling the amount of power applied by the power means to the primary ram.

The machine may be utilized for compacting or baling the materials above referred to and particularly offers advantages with respect to compacting fibrous material such as pulp and various compressible materials as metal foils, which may be conveyed by a conventional means, such as air, through one or more conduits, ducts and conduits to the collector 3, the latter of which receives the conveying air and the material conducted thereby. The machine constitutes a terminus for the conveyed material where it is compacted into a predetermined condition or bale of substantially uniform density. More particularly, the discharge or feed chute 8 directs the flow of material from the collector to the receiving chamber 9 of the machine and absorbs surges between the capacity of the machine and excess material delivery. The chute also serves to insure a static head of material in the chute over the baling chamber whereby to promote maximum capacity of the baler and uniform density in vertical planes of the processed bale.

The machine or baler 2 is preferably constructed from relatively heavy stock to provide, among other things, a substantial frame having a pair of longitudinal beams 14 supported on cross beams 15, an end wall structure 16, and a horizontal wall 17 supported by the longitudinal beams 14 and constituting a lower or bottom wall of the elongate chamber as shown in FIGURES 3, 4, 5, 6 and 9. The second or forming chamber constitutes a continuation of the first chamber, and an ejection chamber 18, which may be considered as being a lateral extension of the forming chamber. The structural characteristics of the chambers will be described more in detail subsequently.

The machine or baler also comprises, among other things, controls within a cabinet 19 for the majority of the electrical controls of the machine, while a unit 20 shown in FIGURE 2 contains generally the fluid control components of the hydraulic circuitry illustrated in FIGURE 16. The ram 11 has a piston rod 21 which is actuated through a cylinder 22. The chamber 9 generally includes a stationary top wall 23 which is disposed above and in parallel relationship to the bottom wall 17 of the machine and a pair of fixed imperforate vertically disposed parallel side walls 24. The chamber 10 generally includes the top and bottoms walls 23 and 17 and a pair of fixed perforated vertically disposed parallel side walls 25 constituting continuations of the fixed imperforate side walls 24. The bottom wall 17, in the area between the perforated side walls 25, is also perforated. The perforations of walls 25 are disposed forwardly of chute 8 in the forming chamber 10 to provide for liquid and/or air escape while the mass is under compression.

As evidenced in FIGURES 4, 5 and 6, the ram 11 is provided with pairs of wheels which ride on rails provided therefor. The ram is provided with a rearwardly extending bar member 26 which carries a pair of longitudinally spaced abutments or lugs 27 and 28 which are adjustable with respect to one another on the rod. The lug 27 is disposed for engagement with a pair of switches L3 and L4 which are adjustable longitudinally with respect to one another and the abutment whereby to control the travel of the ram during certain ram cycles while lug 28 is disposed for engagement with a switch L5 which is also adjustable longitudinally with respect to the rod 26 whereby to control the travel of the ram during other ram cycles, all of which will be described more in detail subsequently.

The top wall 23 of the machine, as depicted in FIGURE 5, is provided with an entrance 29, communicating with the chute 8, through which the material is initially received in the first or receiving chamber 9. This wall extends between the chute and the end wall structure 16 and includes a portion 30 extending to the left of the chute. The wall is reinforced by a plurality of three horizontally spaced upper longitudinal members or portions 32 and a plurality of longitudinally spaced transverse braces or portions 33, the members and braces being welded to the upper surface of the top wall. The side edge on the bale discharge side of the top wall in the area of the ejection chamber 18 is preferably upturned as indicated at 34 in FIGURE 9 in order to facilitate release of a formed mass or bale such as the mass or bale 35; and the bottom wall at the discharge side of the ejection chamber is supported by a structural member 36 which also serves as a fastening member for a bale supporting platform 37. The top, bottom, and side walls above referred to, in combination with the impact or frontal surface of the primary ram 11 and a rear end of a mass 38 being formed, may be considered to constitute the first chamber 9.

The perforated side walls 25, as exemplified in FIGURES 3, 4 and 10, respectively extend longitudinally and forwardly from the walls 24 to the outer edges of legs or vertical supports 39 to which they are securely fastened. The legs 39 are welded to the top and bottom walls 23 and 17, braces 33 and to a pair of upper beams and a pair of elongate horizontal side members 40. The pairs of vertically spaced horizontal inner plates 41 are provided with clearance openings 42 for fluid passage and are secured to the perforated walls 25 and the legs 39. A pair of outer cover panels 43 are attached to the vertical supports 39 and bear against the members 40 and plates 41 to form sealed side chambers for directing fluid to a sump 44 having a drain outlet 45. A cross bar 46 is secured in relation to the legs 39, top wall 23, braces 33 and the chute 8. The lower portions of the perforate walls 25 are preferably welded to the bottom wall 17 and its upper portions to the top wall 23 and members 40. A pair of elongate horizontal side supports 47 extend throughout the length of the bottom plate 17 and are welded thereto, including a rear wall 48 of the end wall structure 16, supports 39, and the side walls 24 and 25. This arrangement forms a rigid elongate chamber which is not subject to distortion by the compression of materials therein.

The end wall structure 16 which serves to receive the impact from the compacted mass of material includes an end wall 48 which is reinforced by a pair of vertical members 50 and upper and lower horizontal members 51 welded thereto. A mounting plate 52 is secured to the wall 48 and has holes 53 therein through which tie rods 54 extend for securing a cylinder 55 for the secondary ram 12 to the structure 16. The structure 16 is welded or otherwise secured to the upper horizontal members 32, top wall 23, bottom wall 17, beams 14, side supports 47 and a pair of side plates 56 are welded to the end wall 48, bars 32, bottom wall 17 and the supports 47. The end wall 48 is provided with an opening 57 and a bottom plate 58 forming a floor mounting pad. An elongate horizontal stationary member 59 has an inner end attached to the wall 48 and an outer end attached by a fitting 60 to an outer end of the cylinder 55. An elongate bar 61 extends through the opening 57 in the end wall 48 and has an inner end connected to the secondary ram 12 for movement therewith and an outer end which is slidably connected to the member 59. A plurality of three switches L6, L7 and L8 are fastened to the upper of the horizontal members 51 and provided with actuators or cams for selective engagement with an adjustable abutment 142 on an adjustable member 143 carried by the bar 61.

The secondary or resistant ram 12 has a piston rod 62 which is operable in the cylinder 55. The ram head is preferably provided with outturned edges 63 and 64 as illustrated in FIGURE 15 which serve to compact the corners of the bale or mass and thereby prevent the corners from crumbling and breaking off particularly when the ram is being separated from the mass or bale, as well as during transport or handling operations.

The machine also preferably includes a third or ejector ram assembly generally designated 65 as depicted in FIGURES 2, 9, 11 and 12. This ram is operable in conjunction with the primary and secondary rams and includes a head structure or assembly 66 secured to a piston rod 67 for the ram head by an adapter 68. This rod is operable in a cylinder 69 and the head structure comprises a plate 70 fixed to the adapter and a member 71 which is adjustably mounted on the plate 70 by means of bolts 72. These bolts are carried by the plate 70 and extend through slots 73 provided in the member 71. The plate 70 is preferably reinforced or fabricated by diagonal ribs 74. This arrangement allows for lengthening or shortening the effective impact receiving area or face of the ejector ram assembly depending on the size of the mass or bale to be formed.

The machine, as shown in FIGURES 2 and 9, also includes a pair of offset members 75 which straddle the cylinder 69 and a structural member 76 which are welded to constitute components of the frame. The member 76 carries the cylinder 69 and a support 77 is attached to one of the members 75 and carries a pair of switches L1 and L2. A bar 31 has an inner end attached to the head structure and an outer extremity which is slidably supported in a bushing 80 mounted on the support 77. This bar 31 carries a pair of cams or abutments 78 and 79 for respectively tripping the switches L1 and L2 which will be described more in detail subsequently. The reciprocation or forward and rear strokes of the ejector ram is thus adjustable.

In some instances, it may be desirable to alter the amount of material, to be compressed by one stroke of the primary ram. Also, under certain conditions, it may be desirable to relieve the material in the feed chute 8 or in an extension 81 thereof. One setup to obtain one or the other or both of these conditions is to utilize an adjustable divider 82 which may be mounted and fastened in the chute 8 in any one of a number of infinite or selective positions as illustrated in FIGURES 3 and 14. An adjustable divider 83 is disposed in the chute extension 81. The bottom edge of divider 83 must always be in alignment with the top edge of the divider 82. Also, the dividers 82 and 83 must always be vertical or inclined forwardly with respect to the bale chamber 10 side of chute 8 and 81, but they may be arranged angularly with respect to one another as shown. Pairs of longitudinally spaced means, such as screws or bolts 82' may be used to detachably secure the lower divider 82 in the lower section 8 and pairs of longitudinal spaced means 83' may be used to secure the upper divider 83 in the section 81.

The hydraulic system or circuitry 13 exemplified in FIGURE 16 of the drawing will now be described. The purpose of this system is to provide fluid power for the ram with sufficient thrust and at such rates of speed as to develop the results desired for efficient compacting or baling operations. The hydraulic system is under control of the electric circuitry which is so arranged that an electrical control circuit must be energized before any hydraulic component can function. Thus, an electric eye sensor 90 and a light source 91 are mounted on the feed chute 8 and electrically connected to an electric eye control 129 which contains, among other things, an electrical relay with an adjustable time delay. When the electrical circuit is manually energized a beam of light is focused between the sensor 90 and source 91 through the chute 8. As long as the beam is uninterrupted a motor 93 of the hydraulic circuit remains deenergized and the primary ram 11 will be at rest in a predetermined forward position as illustrated in FIGURE 5. At the beginning of formation of a bale the secondary or resistance ram or platen 12 is in its extended position as shown in FIGURE 4, and the ejector ram head 66 is in its retracted position as shown in FIGURE 16. The circuit in FIGURE 16 is illustrated as being at rest or in a deenergized condition.

When material is delivered to the machine through the feed chute 8 it forms a vertical column in the chute rising from the top of the ram 11 to the height of the sensing means 92 material delivery may be interrupted. When the material column builds vertically upward to interrupt or block the light beam, certain electrical controls, to be described later, are energized causing the motor 93 to function. An actuator of switch LS4 depressed by the abutment 27 causes solenoid B of a valve 94 to be electrically energized shifting a spool thereof to the left, thereby connecting ports 95 with 96 and 97 with 98 of this valve. The motor 93 drives a pair of pumps 99 and 100, which draw fluid from a storage tank or reservoir 101 and through a filter 102. The fluid circulates through the pumps and is delivered to a pipe or line 103. The pump 99 is connected to the line 103 by a check valve 104 and a line 105 which is connected to an unloading valve 106. A line 107 connects a relief valve 108 with the line 103. A pilot pressure line 109 connects line 107 with the unloading valve 106 and a line 110 is a common drain line to the tank 101. The pumps and valves are organized to provide fluid delivery to the line 103 by both pumps until a predetermined fluid pressure is developed in line 103. When this pressure is developed pressure on the fluid in lines 103, 107 and 109 causes the valve 106 to open thereby by-passing fluid from the pump 99 through line 105, valve 106, and line 110 to the tank 101. When fluid pressure in line 103 is greater than a preset resistance in valve 108, fluid will by-pass from pump 100 through line 107, valve 108, line 110 to tank 101. This arrangement serves to protect the power source from overload and develops high fluid volume at low pressure and reduced fluid volume at high pressure while maintaining a relatively constant primary power usage.

A line 111 connects line 103 with a four-way valve 112 and a line 113 connects the line 111 with the port 95 of the four-way valve 94. Also, a line 114 connects the port 96 with a port provided at a fore end 115 of the cylinder 22, and a line 116 connects the port 98 with a port provided at a rear end 117 of the cylinder. A check valve 118 is interposed in the line 116 and its pilot section is connected to the port 96 by a line 119 and a line 120 is connected to the port 97, a check valve 121, and to the tank 101. Lines 122 and 123 connect the unloading valve 106 with a port provided in a fore end 124 of the cylinder 69 of the ejector ram structure 65 and a check valve 126 is interposed in the line 122. The organization is preferably such that when fluid flows from line 103 through lines 111 and 113, ports 95 and 96 of the valve 94, line 114 and the port at the fore end 115 of the cylinder 22, it will force the cylinder rod 21 and ram 11 rearwardly to the position shown in FIGURE 4, and cause the abutment 27 on the rod 26 to depress a cam on the switch L3. During the rearward travel of the cylinder rod and ram 11, the valve 118 will be opened by pressure of fluid flowing from line 114 through pilot line 119. The valve 118 thus having been opened by the fluid pilot pressure, allows for the fluid to be forced to flow from the port at the rear end 117 of cylinder 22, through line 116, valve 118, ports 98 and 97 of the valve 94, line 120 and check valve 121 to the tank 101. Fluid is also directed from the pump 99 through the lines 105 and 122, check valve 126, and line 123 to the port at the fore end 124 of the ejection ram cylinder 69 to insure that the rod side of the cylinder is pressurized at all times, except when the valve 112 is actuated. This provided a fail-safe circuit which serves to prevent the ejector ram from creeping forwardly during a portion of the mass or bale forming cycle.

When the switch L3 is actuated by the abutment 27 through the rear motion of the ram, certain electrical control relays are actuated to deenergize a solenoid B of the valve 94, above referred to, and energize or actuate a solenoid A of this valve to shift its spool to the right and thereby cause the pump to deliver fluid through ports 95 and 98 of the valve 94, line 116 and valve 118 to the port at the rear end of the cylinder 22 to advance the cylinder rod and primary ram 11 forwardly until the abutment 27 actuates the cam of the switch L4. During the forward travel of the rod and ram 11, fluid is also forced from the fore end 115 of the cylinder 22 through the line 114, ports 96 and 97 of the valve 94, line 120, check valve 121 and to the tank 101.

If the material delivered to the feed chute is sufficient to interrupt the light beam of the electric eye sensors 90 and 91 before the ram 11 completes its forward stroke to cause the abutment 27 to actuate the switch L4, the motor 93 will continue to operate and the ram cycle will be repeated. However, if the light beam of the electric eye sensors 90 and 91 is not interrupted, the ram 11 will then advance to a forward position, causing the abutment 27 to actuate the switch L4 and the solenoid A of the valve 94 will be deenergized so that the spool of this valve will block the flow of fluid to or from the cylinder 22 and the motor 93 will stop.

When material is being compressed into the mass 38 or laminations 127 by the ram 11 against the secondary ram or platen 12, as depicted in FIGURES 5 and 6, fluid pressure is developed in the cylinder 55 of the secondary ram structure between its piston and rear end 128. The resistive pressure in this cylinder is regulated by the flow of fluid from the cylinder as the resistance ram or platen is driven rearwardly by the advancement of the primary ram 11 and the mass, laminations, or bale. The secondary ram and the lines and valves are operatively connected thereto and are such that fluid will flow from a port at the rear end 128 of the cylinder through lines 125, 130 and 300 and a flow control valve 132 to a pressure pilot valve 133. The valve 133 is of a type which may be manually adjusted to a desired baling pressure within the limits of the power means or source and density or compactness of the mass or bale. When sufficient fluid pressure is obtained in the cylinder 22, fluid will flow from the line 116 through a pilot line 134 which opens the valve 133 to allow fluid to flow through this valve, line 135 to the tank 101. When the valve 133 opens to drain fluid from the cylinder 55, the pressure in the cylinder will drop thereby reducing the resistive pressure against the mass or bale and the ram 11. The pressure drop in the pilot line 134 serves to close the pilot valve 133. Since the pumps 99 and 100 are of the constant delivery and constant pressure type, fluid pressure is always available or instantaneously developable to the preset pressure of the valve 133 as the ram 11 and mass continue to advance forwardly against the secondary or resistance ram 12. The repetitive opening and closing of the valve 133 by sensing of the fluid pressures serves to vary the periodicity of the retraction and stopping of the secondary ram while the primary ram advances at a predetermined uniform rate during at least a portion of its forward travel to obtain a mass of maximum uniform density.

An alternative pressure regulating system is provided which does not employ the method above referred to. More particularly, the alternative system routes the flow of fluid from the line 300 through a line 136 after manually closing the valve 132 and opening a valve 137 so that fluid will flow through a preset relief valve 138 and to the tank 101. Also, when the valves 132 and 137 are both opened, valve 138 may serve as a safety valve when set to a pressure which is somewhat higher than that required for the operation of valve 133. A different system may also be obtained by variably closing valve 132 whereby to meter the fluid flow through valve 133 which is held open by pilot pressure and has a fluid passing capacity greater than the metered flow.

As the secondary ram 12 is driven rearwardly, fluid is drawn into a fore end 139 of the cylinder 55 from the tank 101 through a valve 140 interposed in a line 141 connected to said end of the cylinder.

When the mass or bale has been formed to a desired or predetermined condition as to size or weight, as indicated by the laminated mass 127 in FIGURE 6, an elongated adjustable abutment 142 prelocated on a rod 61 will actuate the switch L6. This rod is fastened by any suitable means to the ram 12 for movement therewith. The setup is such that certain electric controls operate in a manner whereby the ram 11 will advance the compacted bale or material toward an ejecting position while the switch L4 is overridden by the abutment 27, as illustrated in FIGURE 6 and the abutment 142 actuates the switch L8 to effect energization of a solenoid C of a valve 144 to open this valve and allow fluid to freely flow from the rear end 128 of the cylinder 55 through the lines 125, 130 and 145, valve 144, and to the tank 101. The ram 11 thus advances the compacted material a predetermined or final distance without resistive pressure until the switch L5 is actuated by the abutment 28 on the rod 26 which causes solenoid G of valve 158 to energize opening the valve and allowing fluid to flow through lines 116, 159, valve 158, lines 157 and 141, to the fore end 139 of the cylinder 55 whereby to force the secondary ram 12 rearwardly until a prelocated abutment 142, adjustable on the member 143, actuates the switch L7 which deenergizes the solenoid C of the valve 144 and a solenoid A of the valve 94. A solenoid D of the valve 112 is also energized provided the switch L1 is actuated or depressed by an abutment 78 adjustable on the rod 31 which is movable with the ram head 66 whereby to shift the spool of the valve 112 to communicatively connect its ports 149 and 150 and ports 151 and 152 thereof. Fluid will also flow from line 103 through line 111, ports 149 and 150 of valve 112, a line 153 and a port provided in a rear end 154 of the cylinder 69 which forces the ejector ram 66 forwardly for pushing the compacted mass or bale 127 laterally and outwardly onto the platform 37, as illustrated in FIGURE 9. When the ejector ram 66 is advancing, fluid will flow from the inner end 124 of the cylinder 69 through line 123, ports 151 and 152 of valve 112 to the tank 101. When a prelocated abutment 79 adjustable on the rod 31 actuates the switch L2 the solenoid D of valve 112 is deenergized and a solenoid E of this same valve is energized causing its spool to shift and communicatively connect port 149 with 151 and 150 with 152 so as to allow fluid to flow through line 111 and ports 149 and 151 of the valve, line 123 to the cylinder 69 to cause the ram 66 to retract, while fluid is discharged from this cylinder through a port at its rear end 154, line 153, and ports 150 and 152 of valve 112 to the tank 101. When the abutment 78 on the rod 31 actuates the switch L1 a solenoid E of valve 112 is deenergized to close this valve and energize a solenoid F of a valve 156 to open this valve and energize the solenoid B of valve 94 whereby to allow fluid to flow through lines 111 and 113, ports 95 and 96 of valve 94, line 114, a port at the fore end 115 of the cylinder 22 and also through a valve 157 interposed in the line 114, valve 156, line 125 and the port in the rear end 128 of the cylinder 55 to advance or impart forward motion to the secondary or resistance ram 12. As the resistance ram 12 advances, fluid is forced through a port at its fore end 139, lines 141 and 157, a valve 158, line 159, line 116 and ports 98 and 97 of valve 94 to the tank 101. Since fluid pressure is also available to the port at the fore end 115 of the cylinder 22 through the line 114, the ram 12 may move to the left to disengage the abutment 28 from the switch L5, thereby deenergizing a solenoid G of the valve 158. The valve 158 allows for a by-pass of fluid from line 157 to line 159. When a dead head position of the secondary ram 12 is reached, as shown in FIGURE 4, fluid will flow through line 114, the port at the fore end 115 of the cylinder 22 to move the ram 11 rearwardly. When the abutment 27 actuates the switch L4, the solenoid F of the valve 158 is deenergized to close the valve and deenergize the solenoid B of valve 94 to shift its spool to a center position and thereby stop movement of the ram and interrupt the flow of current to the motor 93, unless the material in the said chute 8 has blocked the light beam, in which event the motor will continue to run and effect a new cycling action.

The electrical system or circuits, as exemplified in FIGURE 17 will now be described. The purpose of this circuit is to provide primary electrical power to the motors herein connected and reduced voltage power for the control circuit. The control circuitry is so interconnected as to provide the sequence of operations necessary for the equipment to function or operate as one integrated unit.

Primary power supplied by the purchaser is connected to a switch 160 and to a motor starter 161. A pair of conductors 162 and 163 for the motor are connected to overloads 164 and 165 and a third conductor 166 directly connects the motor starter with the motor 93. A two-conductor connection is made on the downstream side of the switch 160 to a reducing voltage transformer 167 which provides reduced voltage power for all of the controls hereinafter referred to. A conductor 168 from the low voltage side of the transformer may be considered as a common conductor. Another conductor 169 is connected to the transformer and a fuse 170 and a conductor 171 is connected to the fuse and the upstream side of a control switch 172.

The switch 172 is shown in the "off" position and all electrical controls are shown in their respective deenergized positions. When the switch 172 is manually turned to the "on" position, current will be conducted to the entire control circuitry. More specifically, current will be conducted through a conductor 173 to an indicating light or signal 174 and then to the conductor 168. Current also flows through a conductor 175 through the electric eye control relay 129 to the conductor 168 and through a stepdown transformer 177. Current to the electric eye light source 91 is received from the transformer 177. Current further flows from conductor 175 through conductors 178 and 179 to a contact 180 of a multiple contact three-way selector switch 181. When the primary ram 11 is in an intermediate position as illustrated in FIGURE 5, the abutment 27 operates the switch L4 closing contact L4A and L4D and opening contact L4B and L4C thereof. If the material flowing through the chute 8 breaks the beam of light from the eye 91, contacts 129A and 129D of the electric eye relay 129 close and contacts 129B and 129E will open to establish a circuit whereby current will flow through the conductor 175, contact L4A and contacts 129A of relay 129, a coil 230C of relay 230 and a line 230' to the line 168. This closes a pair of contacts 230A of the relay 230 establishing a circuit through conductors 175 and 178, a conductor 189, the contacts 230A, a coil 161C of the starter 161, overloads 164 and 165 to conductor 168. At this point the motor 93 starts and activates the hydraulic pumps 99 and 100. The relay 230 is of the latch type and when the coil 230C is energized the contacts 230A will remain closed until it is unlatched by the energization of a coil 230C'. Current also flows from the contact L4A through a conductor 192, contacts 129D of relay 129, contacts 229F of a relay 229, contacts 228'G and a coil 228C of a relay 228, contact L3B of the switch L3 to conductor 168. When the coil 228C is energized, pairs of contacts 228A and 228B close to establish a circuit through conductors 234 and 199, contacts 228B, a conductor 200, a solenoid B of the valve 94 to the conductor 168. This then causes the spool of the valve 94 to shift allowing the ram 11 to move rearwardly. If the light beam is reestablished after the ram starts its rearward travel with the abutment 27 moving off switch L4 to open the contacts L4A and L4D while closing the contacts L4B and L4C, a sealing circuit is established by current flowing from conductor 175 through contacts L6A of the switch L6, contacts 202 and 203 of switch 181, a conductor 204, contacts 228A and 228B of relay 228, conductor 200, solenoid B of the valve 94 and to the conductor 168. This organization assures that the ram 11 will always complete a cycle of its operation. As the ram reaches its rear position the abutment 27 operates the switch L3 opening its contact L3B and closing its contact L3A, thereby deenergizing the coil 228C to open contacts 228A and 228B, while closing contacts 228F of relay 228, whereby to establish a new control circuit from conductor 175 through contact L7C of switch L7, contact L4B of switch L4, contact L3A of switch L3, the contacts 228F of relay 228 and a coil 228'C of relay 228' to conductor 168. Energization of the coil 228'C closes pairs of contacts 228'D and 228'E and opens the pair of contacts 228'G, all of the relay 228' to allow current to flow through a conductor 210, contacts 228'E of the relay 228', a conductor 211, a solenoid A of the valve 94 to conductor 168. The spool of valve 94 shifts and allows the ram 11 to advance so that the abutment 27 will move off the cam of the switch L3 to open the contact L3A. A sealing circuit is established by current flowing through a conductor 213, a pair of contacts 214 and 215 of the switch 181, conductor 216, contacts 228'D and 228'E of the relay 228', conductor 211, solenoid A of the valve 94 to conductor 168 to maintain movement of the ram 11 to its completed forward stroke.

When the ram has advanced to its normal forward position, the abutment 27 depresses the cam on the switch L4 closing the contact L4A while opening the contact L4B of this switch. Opening of the contact L4B interrupts the circuit and deenergizes the coil 28'C to open the contacts 228'D and 228'E of the relay 228' thereby deenergizing the solenoid A of the valve 94 to stop the ram at the normal forward position to complete a cycle of such ram and the motor 93 stops. A circuit through contact L4A of switch L4, contacts 129B and 129E of relay 129, a contact L6C of switch L6, contacts 229E of relay 229, coil 230C' of relay 230, conductor 230' to the conductor 168 keeps the electrical circuit alive until the beam of light from the lamp or signal 91 is again interrupted.

The above sequence of operation will repeat until a bale has been made to a predetermined condition or size. On the last forward stroke the secondary ram 12 having been forced rearwardly as previously described in the operation causes the member 143 on a bar 61 associated with this ram to depress a cam on the switch L6 for opening the contacts L6A and L6C and closing the contacts L6B and L6D. This function sets up the electrical circuit for continuity after a bale has been made to length. By closing the contact L6B of the switch L6 a by-pass circuit is established around and through the contact L4B. Then as the abutment 27 overrides the cam of the switch L4 it will open the contact L4B of this switch when the primary ram 11 advances past or beyond its normal forward position and the ram continues its forward travel advancing the mass 38, laminations 127 or bale toward the ejection position. The contact L6B of the switch L6 is kept closed by the member 143 which maintains the cam of this switch depressed. As long as the contact L7C of the switch L7 is closed the primary or baling ram 11 will advance the mass and move the secondary ram 12 rearwardly. While the primary ram 11 and its associated abutment 27 are in forward motion and in some position between the switches L3 and L5 and the member 143 is depressing the cam of the switch L6 the cam of switch L8 will also be depressed by the member 143, thereby closing contact L8A of switch L8. The switch L8 controls a solenoid C of a valve 144 whereby resistance pressure can be released from the mass or bale during some preset or predetermined variable distance during at least a portion of the forward travel of the primary ram 11 and mass depending upon the condition of the mass. To accomplish this function a circuit is established with current flowing from the conductor 175 through contact L5D of the switch L5 and a contact L7A of the switch L7, a conductor 220, contacts 229G of the relay 229, solenoid C of a valve 144, contact L8A of the switch L8, a contact L6D of the switch L6 to the conductor 168. A contact L5D of the switch L5 and a contact L7A of the switch L7 are in parallel to satisfy the requirements that the primary ram 11 will fully advance with the forward face or impact area of the ram 11 at least flush with the side walls 25 of the bale chamber 10. The resistance ram 12 is pushed rearwardly during the operation to satisfy conditions to enable ejection of the mass 38, laminations 127 or bale without conflicting with subsequent operations of the system.

When the baling ram 11 is fully advanced the abutment 28 depresses a cam on the switch L5 opening its contact L5D while closing contacts L5C and L5A energizing a solenoid G of a valve 158 causing fluid to flow to the fore end 139 of the cylinder 55, forcing the resistance ram 12 rearwardly by hydraulic pressure. A solenoid C of valve 144 will remain energized until the resistance ram has been moved to a predetermined position. The switch L7 will be positioned for tripping its cam by the abutment 142 for opening the circuit to the solenoid C of the valve 144 to cause its spool to block the flow of fluid and deenergize the solenoid A of the valve 94 causing its spool to shift to a blocked position.

When the cam of the switch L7 is tripped by the abutment 142, a circuit is made to cause the ejector ram 66 to move forwardly. An initial circuit for positioning the contacts of the relay 131 is established through conductor 175, contact L5C of the switch L5, contacts 229H of the relay 229, a contact L1D of switch L1 by virtue of the fact that the ejector ram is in the retracted position with the abutment 78 resting on the cam of switch L1, contacts 132A of a relay 132, coil 131C of the relay 131, contact L2A of switch L2, contact L8A of switch L8, contact L6D of switch L6 to conductor 168, closing contacts 131B and 131D and opening contacts 131A, all of the relay 131. The second circuit for energizing the solenoid D of the valve 112 is made through conductor 175, contact L5C of switch L5, contacts 229H of relay 229, contact L1D of switch L1, a conductor 242, contacts 131D of relay 131, a conductor 243, a contact L7B of switch L7 which was closed when the cam of switch L7 was actuated, solenoid D of valve 112, conductor 224, contact L8A of switch L8, contact L6D of switch L6 to conductor 168. When the ejection ram moves forwardly disengaging the abutment 78 from the cam of the switch L1 the contact L1D opens and the sealing circuit contacts 131B of the relay 131 shunt the current from the open contact L1D through a conductor 245.

The ejector ram 66 positions the laminated bale for movement transversely of the machine as shown in FIGURE 9. The distance of its travel is dependent on the location of the adjustable abutment 79 on the rod 31. When the abutment 79 depresses the cam of the switch L2 its contact L2A is opened and its contact L2B is closed, thereby deenergizing the coil 131C of the relay 131 and the solenoid D of the valve 112 causing its spool to shift to a closed position to stop forward travel of the ejector ram. Simultaneously, an initial or first circuit is established through the conductor 175, contact L5C of switch L5, a conductor 246, contact L2B of switch L2, contacts 131A of relay 131, coil 132C of relay 132, contact L1C of switch L1, conductor 244, contact L8A of switch L8, contact L6D of switch L6 to conductor 168. The second circuit for energizing a solenoid E of the valve 112 extends through conductor 175, contact L5C of switch L5, contact L2B of switch L2, a conductor 247, contacts 132D of relay 132, a conductor 248, solenoid E of valve 112, conductor 244, contact L8A of switch L8, contact L6D of switch L6 to conductor 168. When the ejector ram moves rearwardly disengaging the abutment 79 from the cam of the switch L2 the contact L2B will open but the sealing circuit contacts 132B of the relay 132 shunt the current from the open contact L2B through conductor 246.

Also, in the ejector ram circuit current will flow simultaneously through conductor 175, contact L5C of switch L5, a conductor 246, contacts 132E of relay 132, a coil 229C of relay 229 to conductor 168. Energization of the coil 229C of the relay 229 will open the interlocked contacts 229E to maintain the hydraulic motor energized, open contacts 229F to prevent the baling ram from moving, open the interlocked contacts 229G to prevent the resistance ram from moving and opens contacts 229H to prevent the ejector ram from moving forward and schedules the succeeding sequence or synchronization of operations by closing contacts 229A, 229B, and 229D of the relay 229.

The switches L1 and L2 or other types of controls that sense the travel of the ejector ram may be utilized to automatically control auxiliary equipment to wrap, repress the mass to different densities, convey, weigh, bind, or perform other obvious functions to the bale or mass. One method of control is obtained by a circuit from the conductor 175 through a contact L1B, a coil 249C of a relay 249 to the conductor 168.

When the ejector ram has returned to its rearmost position and the abutment 78 depresses the cam of the switch L1, contact L1C will open to deenergize the circuit to the solenoid E of the valve 112 so that its spool will shift and stop the flow of fluid to the cylinder 69 and thereby stop the ejector ram. A circuit is made through conductor 175, contact L4C of switch L4, contact L1A of switch L1, contacts 229D of relay 229, solenoid B of valve 94 to conductor 168 which causes the baling ram 11 to move rearwardly thereby opening contacts L5C and L5A of switch L5, breaking the circuit to solenoid G of valve 158 and solenoid C of valve 144. This blocks the free flow of fluid from the rod end 139 of cylinder 55 through valve 158, valve 94, to tank 101, and causes restricted flow through the check valve of valve 158 assuring the reverse movement of the ram 11. Simultaneously, a second circuit is effected from conductor 175 through contact L4C of switch L4, contact L1A of switch L1, contacts 229B of relay 229, a solenoid F of a valve 156 to conductor 168. This allows the fluid to flow from valve 94 through line 114, valve 157, valve 156, line 125, and cap end 128 of cylinder 55 forcing the resistance ram 12 forwardly. The hydraulic circuit fluid resistance causes the resistance ram 12 to move to a forward dead head position before the baling ram 11 continues to retract. As the baling ram retracts the abutment 27 will depress the cam of the switch L4 to open its contacts L4B and L4C and close its contacts L4A and L4D. Opening of the contact L4C deenergizes the solenoid F of the valve 156 and the solenoid B of the valve 94, thereby blocking hydraulic fluid in the resistance ram hydraulic circuit to stop the primary or baling ram in a normal retracted position. Simultaneously, another circuit is established through conductor 175, contact L4D of switch L4, contacts 229A of relay 229, a coil 229C' of relay 229 to conductor 168 thereby unlatching the relay 229 and opening the contacts 229A, 229B and 229D, while closing the interlocking contacts 229E, 229F and 229G of the relay 229. The entire electrical circuit, hydraulic circuit and mechanical components thus have been returned to a position preparatory for the formation of another bale. If material is available, the previously described total operation is repeated automatically. If material is not available, the baler automatically shuts down in the following manner until material is available. A circuit is established through conductor 175, contact L4A of switch L4, contacts 129B and 129E of the relay 129, contact L6C of switch L6, contacts 229E of a relay 229, coil 230C′ of relay 230 to conductor 168, thereby unlatching the coil 230C of relay 230 to open its contacts 230A to shut down the hydraulic pump motor 93.

In the use of the machine, a manual electrical control is supplied for the obvious function of inspection, adjustment, maintenance, resetting the automatic system after an inadvertent failure of the power supply to the machine, and related functions. This control is set up for manual momentary attended operation. One method of accomplishing this is shown in FIGURE 17 by having the switch 181 with three positions viz: normally at center automatic "Auto," with a spring return to center from right forward "FWD" and left reverse "REV." These positions indicate the directional movement of the primary or baling ram.

The switch 181 in either manual "FWD" or "REV" position will initiate a control circuit through conductors 175, 178, 179 to contact 180 of the switch 181, through switch 181 to either of the pairs of contacts 220 and 221, coil 161C of the starter 161, the overloads 164 and 165 of the starter 161 and back to conductor 168 to start the hydraulic pump motor 93.

If the primary or baling ram 11 is at a normal stored position with the abutment 27 depressing the cam of the switch L4 and the bale has not been formed to length, the following control circuit will be made for reversing the machine. Current will flow through conductor 175, contact L6A of switch L6, contact 202 and a contact 223 of switch 181, conductors 250 and 234, contacts 228′G, coil 228C of the relay 228, contact L3B of the switch L3 to the conductor 168. Energization of the coil 228C of the relay 228 will close the contacts 228B to energize the solenoid B of the valve 94 to shift its spool to cause the baling ram 11 to reverse. The ram 11 will travel to a rear position where the abutment 27 will depress the cam of the switch L3 to open its contact L3B to deenergize the coil 228C of the relay 228 to open its contacts 228B to deenergize the solenoid B of the valve 94 to shift the spool of the latter valve to stop the flow of fluid and thereby stop the ram even though the switch 181 may continue to be held in a reversing position. When the switch 181 is moved to the center position "AUTO" and the electric eye 91 is not blocked, the pump motor 93 will stop. When material in the chute 8 blocks the beam of the electric eye 91 the automatic cycling will resume. The ram 11 may be moved forward from any rear position between the switches L3 and L4 by turning the switch 181 to a "FWD" position to establish a circuit through the conductor 175, contact L7C of switch L7, contact L4B of switch L4, contacts 214 and 215′ of the switch 181, a conductor 251, conductor 210, contacts 228F of relay 228, coil 228′C of relay 228′ to the conductor 168. Energization of the coil 228′C closes the contacts 228′E of the relay 228′ energizing the solenoid A of the valve 94 so that its spool will shift in order to advance the ram 11 to its normally stored position.

In view of the foregoing, it is to be understood that any suitable power means other than that disclosed herein may be employed. In other words, it is to be understood that the machine or system may be operated in various ways, such as by fluid means, mechanical means, electrical means, or any other suitable or adaptable means.

Also, attention is directed to the fact that the means operatively associated with the secondary ram for determining the resistance it offers to the travel of the mass in the chamber is operatively connected to the power means in such a manner that the latter, in conjunction with other means, controls the flow of the power to all of the rams and particularly to the primary and secondary rams for obtaining a mass or bale of substantially uniform density.

Of further significance is the fact that the invention utilizes a method which comprises compacting material between a pair of rams in a chamber to obtain at one position a mass of predetermined density, moving the mass by said rams from said first position to a second position, releasing the pressure applied to the mass after it has arrived at said second position, moving the mass by said rams to a third position, and then retracting one of said rams with respect to the other to facilitate release of the mass laterally from between said rams.

Moreover, an object of the system is to form a mass having uniform lines of density from the bottom to the top of the mass as formed. Otherwise expressed, the laminations or layers are substantially of uniform cross-sectional dimensions whereby to obtain laminations of substantially uniform density, and thereby promote efficient handling, packaging and storage of the resultant product. More particularly the foregoing is achieved at least in part by the method of forming the mass, applying the forces to the mass, feeding of the material, utilizing the dividers and venting means above referred to.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. In combination: a plurality of walls defining an elongate chamber provided with an entrance at one end for receiving material to be compressed and also with a normally open exit intermediate the length of one of said walls, a pair of axially aligned coacting rams for compressing into a mass material adapted for reception through said entrance, means movable in a direction transverse to said rams for ejecting the mass through said exit after being released by said rams, and fluid power means for reciprocating said rams.

2. In combination: a plurality of walls defining an elongate chamber provided with an entrance for receiving material to be compressed and also with a normally open exit intermediate the length of one of said walls, axially aligned coactable reciprocal primary and secondary rams for compressing into a mass material adapted for reception through said entrance, said secondary ram being movable from a position between said entrance and said exit to a position at one side of the latter, and an additional ram aligned with said exit and being movable in a direction transverse to said first-mentioned rams for ejecting the mass through said exit after it has been released by said rams.

3. A machine comprising a frame provided with an elongate chamber having an opening at one end thereof through which material can be introduced into the chamber and also having a side outlet at its forward end, an axially movable secondary ram, means offering resistance to the forward travel of said secondary ram, a primary ram for moving the material forwardly in the chamber against said secondary ram and moving the latter forwardly against said resistance means whereby to shape the material into a compact mass, means for varying the periodicity of retraction and stopping of said secondary ram, and means for ejecting all of the mass intact through said outlet.

4. A stationary baler comprising a frame provided with an elongate chamber having an opening adjacent one end thereof through which material can be inserted into the chamber and an outlet intermediate its length, a secondary ram, means offering resistance to the travel of said secondary ram in said chamber, a primary ram, means for applying forces to said primary ram to compact into a mass material received in said chamber, sensing means responsive to said applying forces, means operatively connecting said applying forces, said resistance means and said sensing means whereby said applying means controls said resistance means, the forces to said primary ram and the operation of said sensing means to obtain a mass of substantially uniform density, and a ram for ejecting all of the mass intact through said outlet.

5. A baler comprising a frame provided with walls defining a first chamber and a second chamber provided with an outlet intermediate its length, a chute for delivering material into said first chamber, a primary ram and an axially movable secondary ram, power means for applying forces to impart motion to said primary ram for driving the material received in said first chamber against said secondary ram for shaping the material into a mass in said second chamber, means operatively associated with said secondary ram and responsive to conditions and positions of the mass, sensing means responsive to the pressure applied by said power means, means operatively connecting said power means, said associated means and said sensing means for controlling the power applied to said primary ram and said associated means whereby to obtain a mass of substantially uniform density, and means for ejecting all of the mass intact from said second chamber transversely through said outlet.

6. A baler comprising a frame provided with an elongate chamber having an opening at one end thereof through which material can be inserted into the chamber and with an outlet intermediate the length of the chamber, an axially movable primary ram, means for applying forces to said ram for compressing material received in said chamber into a compact mass, a secondary ram axially movable along the same axis as said primary ram forming a part of said chamber and being retractible in response to pressures exerted by the mass during compaction, means for controlling the position of said secondary ram, and means operatively connecting said controlling means and said force applying means.

7. A machine comprising a frame provided with an elongate chamber having an opening at one end thereof through which material may be introduced to the chamber to be compressed and with an outlet intermediate its length, an axially movable secondary reciprocable ram, a primary reciprocable ram, power means for applying pressure strokes to said primary ram for forcibly compressing the material into a mass against said secondary ram and jointly moving the mass by said rams longitudinally in the chamber to said outlet, means associated with said secondary ram offering resistance to its travel and longitudinal movement of the mass, sensing means connected to said power means and said resistance means and responsive to the pressure applied by said power means for automatically controlling the operation of said resistance means and applying substantially uniform pressures to the strokes as the resistance to such movement varies, and means for ejecting all of the mass intact from said chamber transversely through said outlet.

8. A baler comprising a frame provided with walls defining a first chamber for receiving material and a second chamber constituting a continuation of said first chamber and provided with an outlet intermediate its length, a primary ram for driving material received in said first chamber into said second chamber, an axially movable secondary ram having means offering resistance to its travel and the flow of the material in said second chamber, power means, means for applying forces from said power means to impart motion to said primary ram to compact the material into a mass against said secondary ram, means operatively connecting said resistance means and said power means for automatically controlling the amount of power applied to said primary ram and the operation of said resistance means whereby to obtain a mass of substantially uniform density, and means for ejecting all of the mass intact from said second chamber transversely through said outlet.

9. A machine comprising a frame provided with an elongate stationary chamber having an opening through which material to be baled is introduced into the chamber and an outlet intermediate its length, a secondary ram axially movable in said chamber, a primary ram for compressing charges of the material into a compact mass against said secondary ram and jointly moving the mass by said rams to the outlet for ejection therethrough, power means for transmitting strokes of power to said primary ram, first means associated with said secondary ram and responsive to the density of the mass, sensing means responsive to the pressure applied by said power means, and means operatively connecting said sensing means, said first-mentioned responsive means and said power means for controlling said sensing means and said power means to impart substantially uniform pressure to said strokes as the density of the mass increases.

10. A machine comprising a frame provided with an elongate chamber having an inlet and with an outlet intermediate its length, an axially movable secondary ram, a primary ram for compressing charges of material adapted for introduction into said chamber through said inlet, power means for applying forces to said primary ram to gradually compress the charges of material into a compact mass against said secondary ram, means for automatically controlling the amount of power applied to said rams including the retraction of said secondary ram during compaction, means operatively connecting said controlling means and said power means, and means for ejecting all of the mass intact transversely through said outlet.

11. A baler comprising a frame provided with an elongate chamber having an opening at one end thereof through which material can be inserted into the chamber and also having an outlet intermediate its length, a secondary ram axially movable in said chamber, a primary ram reciprocable on the same axis as said secondary ram, means for applying power to said primary ram for forcing it longitudinally forward in said chamber for compressing the material against said secondary ram into a mass and jointly moving the mass by said rams to said outlet, means for determining a condition of the mass while it is being compressed, means for increasing the amount of power applied to said primary ram throughout a portion of its forward travel, means associated with said secondary ram for offering resistance to its travel and travel of the mass, sensing means responsive to the pressure applied by said power means, means operatively connecting said determining means, said resistance means, said sensing means, said power applying means and said power increasing means for controlling said resistance means and the amount of power applied to said primary ram throughout another portion of its forward travel, and means for ejecting the mass intact transversely through said outlet.

12. A baler comprising a frame provided with an elongate chamber having an opening through which material to be compacted is introduced into the chamber and with an outlet intermediate its length, a primary ram for compressing charges of the material into a compact mass, power means for transmitting strokes to said ram, a secondary ram axially aligned with said primary ram and serving as an abutment against which the material is compacted, sensing means operatively associated with said secondary ram and connected and responsive to the pressure applied by said power means and to variable conditions of the mass for automatically controlling the pressure applied to the strokes in accord with such conditions, and means for ejecting the mass intact transversely through said outlet.

13. A machine for compacting material, said machine having walls defining an elongate chamber provided with an inlet and with an outlet intermediate its length, an axially movable primary ram for compacting material adapted for reception in said chamber via said inlet into a compact mass, means for applying power to said ram, a secondary ram movable on the same axis as said primary ram responsive to said power applying means and serving as an abutment against which the material is adapted to be compacted, means operatively connecting said responsive means and said power means whereby to control the power applied to said primary ram and said responsive means for controlling the operation of said rams, and means for ejecting all of the mass transversely through said outlet.

14. A machine for compacting material, said machine having an elongate chamber provided with an inlet and with an outlet intermediate its length, an axially movable primary ram for compacting into a mass material adapted for reception in said chamber, a secondary ram axially movable along the same axis as said primary ram, means for applying variable amounts of power to said rams for compacting the material into a mass therebetween and jointly moving the mass to said outlet for complete ejection therethrough, means operatively associated with said secondary ram for determining a condition of the mass, sensing means responsive to the power applied by said power applying means, and means operatively connecting said determining means, said sensing means and said power means whereby to control the amount of power applied to said rams in response to variable conditions of the mass.

15. A machine for compacting material, said machine having an elongate chamber provided with an inlet and an outlet intermediate its length, a chute directly connected to said inlet for delivering material to said chamber, elongated divider means extending longitudinally in said chute whereby the volume of the material adapted for conduction through the chute may be controlled, a secondary ram movable longitudinally in said chamber offering resistance to the travel of the material therein, a primary ram, means for applying power to said rams for compacting the material therebetween into a mass and moving the mass to said outlet for complete ejection therethrough, means for determining a condition of the mass, sensing means responsive to the pressure applied by said power applying means, and means operatively connecting said determining means, said sensing means and said power means whereby to control the power applied to said rams in response to the condition of the mass.

16. A machine for compacting material, said machine having an elongated chamber provided with an inlet for receiving material and with an outlet intermediate its length, a primary ram for compacting into a mass material adapted for reception through said inlet and forming in said chamber, means for applying this power to said ram, an axially movable secondary ram in said chamber offering resistance to the travel of the mass to said outlet, means associated with said secondary ram for determining a condition of the mass, sensing means responsive to the pressure of said power means, and means operatively connecting said determining means, said sensing means and said power means for automatically controlling the amount of power applied to said primary ram through the agency of said applying means in response to varying conditions of the mass during the operation of the machine whereby to obtain a substantially uniform mass, and means for ejecting all of the mass from said chamber laterally through said outlet.

17. A machine for compacting material, said machine having an elongated chamber provided with an inlet and with an outlet intermediate its length, a primary ram for compacting into a mass material adapted for reception in said chamber, power means, means for applying this power to said ram, means for sensing a condition of said power means, an axially retractible secondary ram including means offering resistance to the travel of the mass in said chamber to said outlet, means operatively connecting said resistance means, said sensing means and said power means for automatically controlling the amount of power applied to said primary ram in response to the condition of the mass and the periodicity of retraction and stopping of said secondary ram, and means for ejecting all of the mass transversely through said outlet.

18. A machine for compacting material, said machine having an elongated chamber provided with an inlet and with an outlet intermediate its length, a primary ram for compacting into a mass material adapted for reception in said chamber through said inlet, power means, an axially movable secondary ram in said chamber offering resistance to the travel of the mass to said outlet for eventual complete discharge transversely therethrough, means for applying this power to said rams, means operatively associated with said secondary ram for determining a position of the mass, means sensing and responsive to said power means, and means operatively connecting said power means, said sensing means and said determining means whereby said sensing means automatically controls the amount of power applied to said primary ram and the operation of said determining means controls the power applied to said secondary ram.

19. A machine for compacting material, said machine having an elongated chamber provided with an outlet intermediate its length, a primary ram for compacting into a mass material adapted for reception in said chamber, means for applying variable amounts of power to said ram, a secondary ram disposed in said chamber in coactable coaxially alignment with said primary ram for moving the mass in a forward direction to said outlet for transverse discharge therethrough, means operatively associated with said secondary ram for offering resistance to its travel in said chamber toward said outlet, means for determining the resistance offered by said secondary ram, and means operatively connecting said determining means and said power means whereby said determining means controls the amount of power in said resistance means and the latter controls the amount of power applied to said primary ram in response to said determining means.

20. A machine for compacting material, said machine having an elongated chamber provided with an outlet intermediate its length, a primary ram for compacting into a mass material adapted for reception in said chamber, power means for applying variable amounts of power to said ram, a secondary ram axially movable in said chamber with said primary ram for moving the mass forwardly to said outlet for transverse ejection therethrough, means associated with said secondary ram offering resistance to its movement toward said outlet, and sensing means operatively connecting said resistance means and said power means whereby the latter controls the operation of said sensing means and said sensing means controls the operation of said resistance means and the latter controls the amount of power applied to said primary ram in response to varying densities of the mass.

21. A tubular chute structure for conducting a material to a chamber for compaction therein, an elongate divider having a substantial surface area disposed in said structure, and longitudinally spaced means respectively provided on the extremities of said structure and said divider facilitating adjustment and securement of the latter in various fixed positions for controlling the volume of the material adapted for conduction through said structure.

22. A chute structure for conducting material to a chamber for compaction therein, said structure comprising a pair of tubular sections secured together in an end-to-end relationship, a pair of dividers respectively disposed in said sections, and means for respectively adjustably securing said dividers in said sections in an end-to-end relationship for variably controlling the volume of the material adapted for conduction through said structure.

23. A machine for compacting material, said machine having an elongate chamber provided with an outlet intermediate its length, an axially movable secondary ram disposed in said chamber, means offering resistance to the travel of said secondary ram in said chamber, a primary ram operable in conjunction with said secondary ram for compacting into a mass material adapted for reception in said chamber and moving the mass forwardly to said outlet, means associated with said secondary ram for determining the density of the mass, fluid power means for applying variable amounts of power to said rams, fluid means operatively connecting said determining means and said power means whereby said power means controls the operation of said determining means, said determining means controls said resistance means and the latter controls the amount of power applied to said primary ram, and means for ejecting all of the mass transversely through said outlet.

24. A machine for compacting a material, said machine having walls defining a chamber, one of said walls being provided with an entrance for receiving the material and another of said walls being provided with a transverse outlet, a first ram and a second ram coaxially movable for compacting the material therebetween into a mass having a predetermined condition and moving the conditioned mass in one direction to a first position, means for releasing the pressure applied to said conditioned mass after it reaches said position, means for further moving the mass in said direction to a position opposite said outlet and said primary ram in a predetermined stationary position in relation to said outlet, means for retracting said secondary ram, and a third ram for ejecting all of the mass through said outlet.

25. A machine for compacting a material, said machine having a chamber provided with an entrance for receiving the material and also provided with a transverse outlet located intermediate the length of said chamber, a first ram and a second ram arranged for coaxial movement in one direction, the first ram forcing the material against said secondary ram to compact the material therebetween into a mass and jointly move the mass in said chamber to a position opposite said outlet, a third ram arranged for ejecting all of the mass transversely through said outlet, and fluid power means for applying power to said rams for effecting their reciprocation.

26. A method which comprises compacting fibrous material between a pair of rams in a chamber having a transverse outlet to obtain in one position a mass of predetermined density, moving the mass by said rams from said first position to a second position, releasing the pressure applied to the mass after it has arrived at said second position, moving the mass by said rams to a third position opposite said outlet, retracting one of said rams to a stationary position with respect to the other, and then driving a third ram transversely through said chamber and between said pair of rams to facilitate release of all of the mass transversely through said outlet.

27. A machine comprising a frame having an elongate chamber provided with an inlet and an outlet intermediate its length, a secondary ram, a primary ram for compressing charges of material adapted for introduction into said chamber through said inlet, fluid power means for applying greater forces to said primary ram than to said secondary ram to gradually compress the charges of material into a compact mass against said secondary ram and moving the mass to said outlet, means for automatically controlling the position of said secondary ram and the amount of power applied to said rams, means operatively connecting said controlling means and said power means, a third ram for ejecting all of the mass laterally from said chamber through said outlet when the mass attains a predetermined condition, and means operatively connecting said third ram and said power means, said fluid power means being operable to axially reciprocate said primary and secondary rams in said chamber and said third ram in a direction transverse thereto.

28. A machine for compacting material, said machine having walls defining an elongate chamber provided with an inlet and an outlet intermediate its length, a secondary ram having a head permanently disposed in said chamber, a primary ram for compacting material adapted for reception in said chamber through said inlet into a compact mass against said head of said secondary ram and moving the mass in one said direction to said outlet, means for applying fluid power to said primary ram, means associated with said secondary ram and responsive to said applying means, means for determining a condition of the mass, means operatively connecting said responsive means, said determining means and said power means whereby to control the power applied to said rams and said responsive means in accord with the condition of the mass, a third ram for ejecting all of the mass exteriorly of said chamber and transversely through said outlet, and said power means being operable to reciprocate all of said rams.

29. A machine for compacting material, said machine comprising an elongated chamber having an inlet for receiving the material and an outlet located intermediate its length, a pair of rams axially movable in the same direction in said chamber for compacting the material received into a compact mass and jointly moving the mass to a position opposite said outlet, a third ram movable in a direction transverse to the axes of said pair of rams for ejecting all of the mass from said chamber outwardly through said outlet, and fluid power means for reciprocating all of said rams.

30. The machine defined in claim 29, including a chute communicatively connected to said inlet for delivering material to said chamber, first venting means disposed adjacent to said chute and inlet for venting one area of said chamber, and second venting means disposed in spaced relationship to said first venting means for venting an adjacent area of said chamber.

References Cited

UNITED STATES PATENTS

| 828,213 | 8/1906 | Jones et al. | 100—207 |
|---|---|---|---|
| 2,697,979 | 12/1954 | MacMurray | 100—218 X |
| 2,722,884 | 11/1955 | Seltzer | 100—192 |
| 2,780,989 | 2/1957 | Guy | 100—244 X |
| 3,024,719 | 3/1962 | Englund | 100—49 X |
| 3,050,809 | 8/1962 | Kupka | 100—264 X |
| 3,099,205 | 7/1963 | Lovrinch | 100—255 |
| 3,145,647 | 8/1964 | Dinkov et al. | 100—53 |
| 3,179,040 | 4/1965 | Seltzer | 100—192 X |
| 3,212,432 | 10/1965 | Raab | 100—43 |
| 3,212,433 | 10/1965 | Raab | 100—53 |
| 3,279,356 | 10/1966 | Raab | 100—45 |
| 2,422,895 | 6/1947 | Habenicht | 100—244 X |
| 2,830,530 | 4/1958 | Powell | 100—244 X |
| 3,070,003 | 12/1962 | Stacy | 100—244 X |

FOREIGN PATENTS

| 1,057 | 1/1916 | Netherlands. |
| 604,358 | 1/1926 | France. |

WALTER A. SCHEEL, Primary Examiner.

L. O. MAASSEL, Assistant Examiner.

U.S. Cl. X.R.

100—43, 189, 244

U.S. DEPARTMENT OF COMMERCE

PATENT OFFICE

Washington, D.C. 20231

UNITED STATES PATENT OFFICE
CERTIFICATE OF CORRECTION

Patent No. 3,438,319                          April 15, 1969

Hilary A. Raab

It is certified that error appears in the above identified patent and that said Letters Patent are hereby corrected as shown below:

Column 6, line 28, "LS4" should read -- L4 --. Column 7 line 67, "ahe" should read -- the --. Column 10, line 44, "28'C" should read -- 228'C --. Column 11, line 56, "224" should read -- 244 --. Column 16, line 73, "receiption" shoul read -- reception --.

Signed and sealed this 7th day of July 1970.

(SEAL)
Attest:

Edward M. Fletcher, Jr.                        WILLIAM E. SCHUYLER, JR.

Attesting Officer                                Commissioner of Patents